UNITED STATES PATENT OFFICE.

WILLIAM H. CUTBIRTH AND JACOB SUMMERS, OF HOLLANDSBURG, INDIANA.

WELDING COMPOUND.

SPECIFICATION forming part of Letters Patent No. 406,887, dated July 16, 1889.

Application filed April 1, 1889. Serial No. 305,515. (No specimens.)

*To all whom it may concern:*

Be it known that we, WILLIAM H. CUTBIRTH and JACOB SUMMERS, citizens of the United States, residing at Hollandsburg, in the county of Parke and State of Indiana, have invented certain new and useful Improvements in Welding and Tempering Compounds; and we do declare the following to be a full, clear, and exact description of the invention, such as will enable others skilled in the art to which it appertains to make and use the same.

The special object of the invention is to exclude air from steel while being welded or shaped into any desired form, so as to prevent the burning and wasting of its carbon.

We are well acquainted with the known welding compounds such as are described in Patents Nos. 53,019, 257,248, 320,819, and 397,478, but do not find them in practice to fully accomplish the object.

Borax, sulphate of zinc, saltpeter, silex, sand, cinder, and glass have all been used at different times and in different combinations; but we have experimented with them all, and find the following compound or mixture to answer the purpose specified with great certainty and very perfectly: saltpeter, one part; borax, four parts; sulphate of zinc, four parts; white flint sand, sixteen parts. They are all brought to as fine and powdery state as possible, then intimately intermixed, and preferably used as follows:

The steel is first heated to a "bright red" and sprinkled with the welding-powder. It is then put back in the fire and heated nearly to a white heat, when it is ready to be taken to the anvil and welded or shaped up as may be desired. It may also be used for tempering by simply heating the steel to a "cherry red," then sprinkling the compound on it; next, replacing it in the fire and letting it again heat to a cherry red; finally, cooling off in rain-water. This will temper the steel nicely for cutting iron, stone, or any other hard substance.

Having thus described all that is necessary to a full understanding of our invention, what we claim as new, and desire to protect by Letters Patent, is—

A welding compound formed of saltpeter, borax, sulphate of zinc, and white flint sand, in about the proportions set forth.

In testimony whereof we affix our signatures in presence of two witnesses.

WILLIAM H. CUTBIRTH.
JACOB SUMMERS.

Witnesses:
GEORGE T. JOHNSON,
GEORGE W. RUSH.